(12) United States Patent
Shirao et al.

(10) Patent No.: US 8,789,644 B2
(45) Date of Patent: Jul. 29, 2014

(54) CONSTRUCTION VEHICLE

(75) Inventors: Atsushi Shirao, Komatsu (JP); Masanori Ikari, Komatsu (JP)

(73) Assignee: Komatsu Ltd., Tokyo (JP)

( * ) Notice: Subject to any disclaimer, the term of this patent is extended or adjusted under 35 U.S.C. 154(b) by 261 days.

(21) Appl. No.: 13/203,770

(22) PCT Filed: Feb. 12, 2010

(86) PCT No.: PCT/JP2010/052086
§ 371 (c)(1), (2), (4) Date: Aug. 29, 2011

(87) PCT Pub. No.: WO2010/109972
PCT Pub. Date: Sep. 30, 2010

(65) Prior Publication Data
US 2011/0308879 A1    Dec. 22, 2011

(30) Foreign Application Priority Data

Mar. 25, 2009   (JP) ................................. 2009-074760

(51) Int. Cl.
| | |
|---|---|
| *B60K 17/10* | (2006.01) |
| *E02F 9/22* | (2006.01) |
| *F16H 61/468* | (2010.01) |
| *F16H 61/421* | (2010.01) |
| *B60W 10/06* | (2006.01) |
| *F16H 61/431* | (2010.01) |
| *B60W 30/188* | (2012.01) |
| *B60W 10/103* | (2012.01) |
| *F16H 59/68* | (2006.01) |

(52) U.S. Cl.
CPC .............. *F16H 61/468* (2013.01); *Y02T 10/76* (2013.01); *E02F 9/2296* (2013.01); *E02F 9/2253* (2013.01); *F16H 2059/6861* (2013.01); *E02F 9/2289* (2013.01); *F16H 61/421* (2013.01); *E02F 9/2292* (2013.01); *E02F 9/2246* (2013.01); *B60W 10/06* (2013.01); *F16H 61/431* (2013.01); *B60W 2710/0666* (2013.01); *E02F 9/2235* (2013.01); *B60W 30/1882* (2013.01); *B60W 10/103* (2013.01)
USPC .......................................... 180/306; 701/55

(58) Field of Classification Search
USPC ......... 180/305, 306; 60/445, 487; 701/51, 53, 701/55, 56; 477/50
See application file for complete search history.

(56) References Cited

U.S. PATENT DOCUMENTS

| | | |
|---|---|---|
| 4,773,369 A | 9/1988 | Kobayashi et al. |
| 5,947,695 A | 9/1999 | Nagaoka et al. |

(Continued)

FOREIGN PATENT DOCUMENTS

| | | |
|---|---|---|
| CN | 1168716 A | 12/1997 |
| CN | 1347818 A | 5/2002 |

(Continued)

OTHER PUBLICATIONS

The Extended European Search Report, issued on Sep. 23, 2013.

(Continued)

*Primary Examiner* — Katy M Ebner
*Assistant Examiner* — Emma K Frick
(74) *Attorney, Agent, or Firm* — Global IP Counselors, LLP

(57) ABSTRACT

A wheel loader (50) is designed so that when a specific first condition is met for vehicle speed, accelerator opening, engine speed, and HST pressure, the engine absorption torque curve of an HST pump (4) is switched to shift the matching point from the low-engine speed side to the high-engine speed side. On the other hand, if a second condition is met for vehicle speed and HST pressure, control is performed so that the absorption torque curve of the HST pump (4) is returned from the high-engine speed side to the low-engine speed side.

2 Claims, 7 Drawing Sheets

(56) References Cited

U.S. PATENT DOCUMENTS

| | | | |
|---|---|---|---|
| 6,442,934 B1 * | 9/2002 | Okuda et al. | 60/451 |
| 6,564,548 B2 | 5/2003 | Nishimura et al. | |
| 7,210,293 B2 * | 5/2007 | Fukasawa et al. | 60/487 |
| 7,246,670 B2 * | 7/2007 | Hayashi et al. | 180/6.2 |
| 7,533,527 B2 * | 5/2009 | Naruse | 60/433 |
| 7,891,182 B2 * | 2/2011 | Kelly et al. | 60/431 |
| 2002/0073699 A1 | 6/2002 | Nishimura | |
| 2004/0211614 A1 | 10/2004 | Matsuyama | |
| 2006/0032221 A1 | 2/2006 | Fukasawa et al. | |
| 2006/0235595 A1 * | 10/2006 | Sawada | 701/50 |
| 2007/0204604 A1 | 9/2007 | Naruse | |
| 2007/0227137 A1 * | 10/2007 | Naruse | 60/426 |
| 2009/0069990 A1 | 3/2009 | Behm et al. | |
| 2011/0196585 A1 * | 8/2011 | Ishibashi et al. | 701/51 |
| 2011/0202243 A1 * | 8/2011 | Ishibashi et al. | 701/51 |

FOREIGN PATENT DOCUMENTS

| | | |
|---|---|---|
| JP | 2004-144254 A | 5/2004 |
| JP | 2005-233420 A | 9/2005 |
| JP | 2007-113304 A | 5/2007 |
| WO | WO-2005/098148 A1 | 10/2005 |

OTHER PUBLICATIONS

The Chinese Office Action of corresponding Chinese Application No. 201080009738.4, issued on Aug. 5, 2013.

* cited by examiner

CONSTRUCTION VEHICLE

CROSS-REFERENCE TO RELATED APPLICATIONS

This national phase application claims priority to Japanese Patent Application No. 2009-074760 filed on Mar. 25, 2009. The entire disclosure of Japanese Patent Application No. 2009-074760 is hereby incorporated herein by reference.

TECHNICAL FIELD

The present invention relates to a construction vehicle that travels by driving a travel hydraulic motor with hydraulic fluid discharged from a hydraulic pump driven by an engine.

BACKGROUND ART

In general, a wheel loader or other such construction vehicle is equipped with what is called an HST (hydro-static transmission), with which an engine drives a hydraulic pump, and a travel hydraulic motor is driven by the hydraulic fluid discharged from the hydraulic pump.

With an HST type of construction vehicle such as this, the speed and traction of the vehicle can be controlled by controlling the engine speed, the volume of the hydraulic pump, and the volume of the travel hydraulic motor.

For example, International Laid-Open Patent Application Publication No. 2005/098148 and Japanese Laid-Open Patent Application Publication No. 2004-144254 disclose work machines (construction vehicles) or the like with which better fuel economy can be attained by varying the absorption torque of the hydraulic pump as dictated by the working situation and so forth.

Although not technology related to an HST type of wheel loader, Patent Literature 1 discloses a construction machine (hydraulic excavator) with which fuel economy is improved by switching the absorption torque of the hydraulic pump while evaluating the working situation. Meanwhile, Patent Literature 2 discloses a wheel loader that travels by driving an HST motor with hydraulic fluid discharged from an HST pump driven by an engine.

SUMMARY

Nevertheless, the following problems are encountered with the conventional construction vehicles mentioned above.

When the absorption torque control of a hydraulic pump performed while evaluating the work situation disclosed in the above-mentioned Patent Literature 1 is applied to the wheel loader equipped with HST disclosed in Patent Literature 2, just as with a hydraulic excavator, fuel economy is improved by low-engine speed matching by switching the absorption torque of an HST pump as dictated by the work situation and so forth. However, the above publications do not examine the ideal combination of conditions in returning the matching point of the absorption torque curve of the HST pump from the high-engine speed side to the low-engine speed side after switching from the low-engine speed side to the high-engine speed side. Accordingly, if the contents of the above publications are combined, there is the risk that the operator may experience an odd sensation, such as a jolt during switching, which is control other than what the operator intended.

It is an object of the present invention to provide a construction vehicle with which conditions can be optimized in switching the matching point of the absorption torque curve of a hydraulic pump between the low-engine speed side and the high-engine speed side, so that fuel economy can be improved and the operator will not experience any odd sensation.

The construction vehicle pertaining to the first aspect of the present invention includes an engine, a travel hydraulic pump, a travel hydraulic motor, an accelerator pedal, a hydraulic sensor, an engine controller, and a controller. The travel hydraulic pump is driven by the engine. The travel hydraulic motor is driven by hydraulic fluid discharged from the travel hydraulic pump. The accelerator pedal adjusts the accelerator opening according to a pressed amount thereof. The hydraulic sensor detects the pressure of the hydraulic fluid sent from the travel hydraulic pump to the travel hydraulic motor. The engine controller adjusts the output torque from the engine. The controller changes the matching point of an absorption torque curve for the travel hydraulic pump with respect to an output torque curve for the engine from the low-engine speed side to the high-engine speed side when a first condition is met, and changes the matching point from the high-engine speed side to the low-engine speed side when a second condition is met. The first condition is satisfied when a vehicle speed and the accelerator opening are prescribed values or higher, and at least one of the engine speed is a prescribed value or lower, the HST pressure sent from the hydraulic sensor is a prescribed value or lower, and the output torque adjusted by the engine controller is a prescribed value or higher. The second condition is satisfied when at least one of the vehicle speed, the HST pressure, and the output torque adjusted by the engine controller is a prescribed value or lower.

Here, in a construction vehicle such as a wheel loader which is equipped with what is called an HST (hydro-static transmission), in which a travel hydraulic pump is driven by an engine, and a travel hydraulic motor is driven by hydraulic fluid discharged from the travel hydraulic pump, when the absorption torque of the travel hydraulic pump (HST pump) is varied according to the travel/work situation of the construction vehicle, etc., the matching point of the absorption torque curve for the travel hydraulic pump with respect to the output torque curve for the engine is switched from the low-engine speed (good fuel economy) side to the high-engine speed (high horsepower) side when the following first and second conditions are met.

More specifically, under the first condition in shifting from a matching point on the low-engine speed side to a matching point on the high-engine speed side, for example, the vehicle speed is at least 10 km/h, the accelerator opening is 80%, and, as a third condition, the engine speed is no more than 1900 rpm, the HST pressure is at least 32 MPa, and/or the output torque of the engine controller is at least 450 N·m. On the other hand, under the second condition in shifting from a matching point on the high-engine speed side to a matching point on the low-engine speed side, for example, the engine speed is no more than 9 km/h, the HST pressure is no more than 29 MPa, and/or the output torque of the engine controller is no more than 400 N·m.

Here, the reason that vehicle speed and accelerator opening are considered to be essential conditions under the first condition is that can imagine a situation in which the driver requires more acceleration during high-speed travel in a wheel loader or other such construction vehicle. The reason that an engine speed of no more than 9 km/h, an HST pressure of no more than 29 MPa, and/or an output torque of the engine controller of no more than 400 N·m is set as the third condition is that a situation in which the engine speed is lowered under a prescribed value during high-speed travel at a relatively high accelerator opening, or a situation in which the HST pressure or the output torque is above a prescribed value at a relatively high accelerator opening, can be imagined when climbing a hill, when the travel hydraulic pump needs more absorption torque. Thus, when this first condition is met, travel in a state of obtaining sufficient absorption torque is possible if the matching point is shifted in the direction of raising the absorption torque of the travel hydraulic pump.

Meanwhile, the reason that a vehicle speed, an HST pressure, and/or an engine controller output torque of no more than a prescribed value is set as the second condition is that we can imagine a situation in which the vehicle departs from high-speed high climbing when the vehicle speed, the HST pressure, or the engine controller output torque drops below a prescribed value. In particular, with the present invention, the second condition does not include the accelerator opening or engine speed included in the first condition. This is because if the accelerator opening is part of the second condition, there is the risk that the control will not be what the driver intended, such as a rise in vehicle speed even though the driver has lifted up on the accelerator pedal. This is also because if the engine speed is part of the second condition, there is the risk that frequent shocks will occur during absorption torque switching.

Consequently, the second condition is set more loosely than the first condition, so work can usually be carried out with good fuel economy by controlling the absorption torque of the travel hydraulic pump so that there is matching only on the high-engine speed side when the first condition needs to be met, and so that there is matching on the low-engine speed side when at least one part of the second condition is met, and when more horsepower is needed, there will be matching on the high-engine speed side so that higher horsepower is obtained at the travel hydraulic pump.

Since condition with an optimal lower limit are set as the second condition for returning from high-engine speed matching to low-engine speed matching, control that is different from what the driver intended, shocks during switching, and the like can be eliminated, and the optimal switching conditions can be set. As a result, the driver will not experience any odd sensation or shocks during control switching, so the work can be carried out more pleasantly.

The construction vehicle pertaining to the second aspect of the present invention is the construction vehicle pertaining to the first aspect, further comprising a working unit/steering pump for driving a working unit. The first condition further includes a third condition that is satisfied when the pressure of the working unit/steering pump is a prescribed value or higher, or a fourth condition that is satisfied when the proportional pressure control (PPC) pressure of an operating lever that operates the working unit is a prescribed value or higher and the electronic pressure control (EPC) lever input is other than a prescribed value. The second condition further includes a fifth condition that is satisfied when the pressure of the working unit/steering pump is a prescribed value or lower, or the PPC pressure is a prescribed value or lower and the EPC lever input is the prescribed value.

Here, if the fact that a working unit is being operated is detected by means of the third condition or the fourth condition during medium- to high-speed travel, the matching point is shifted from the low-engine speed side to the high-engine speed side so that the absorption torque of the travel hydraulic pump will be higher. On the other hand, if the operation of the working unit is concluded during medium- to high-speed travel, the matching point is shifted from the high-engine speed side to the low-engine speed side in order to lower the absorption torque of the travel hydraulic pump and improve fuel economy.

Consequently, the optimal absorption torque for a work situation can be obtained at the travel hydraulic pump by similarly switching the matching point when the use of the working unit is detected during medium- to high-speed travel, in addition to the first and second conditions during high-speed travel discussed above.

DESCRIPTION OF EMBODIMENTS

Embodiment 1

A wheel loader (construction vehicle) 50 pertaining to an embodiment of the present invention will now be described through reference to FIGS. 1 to 6.

Overall Configuration of Wheel Loader 50

Figure 1:
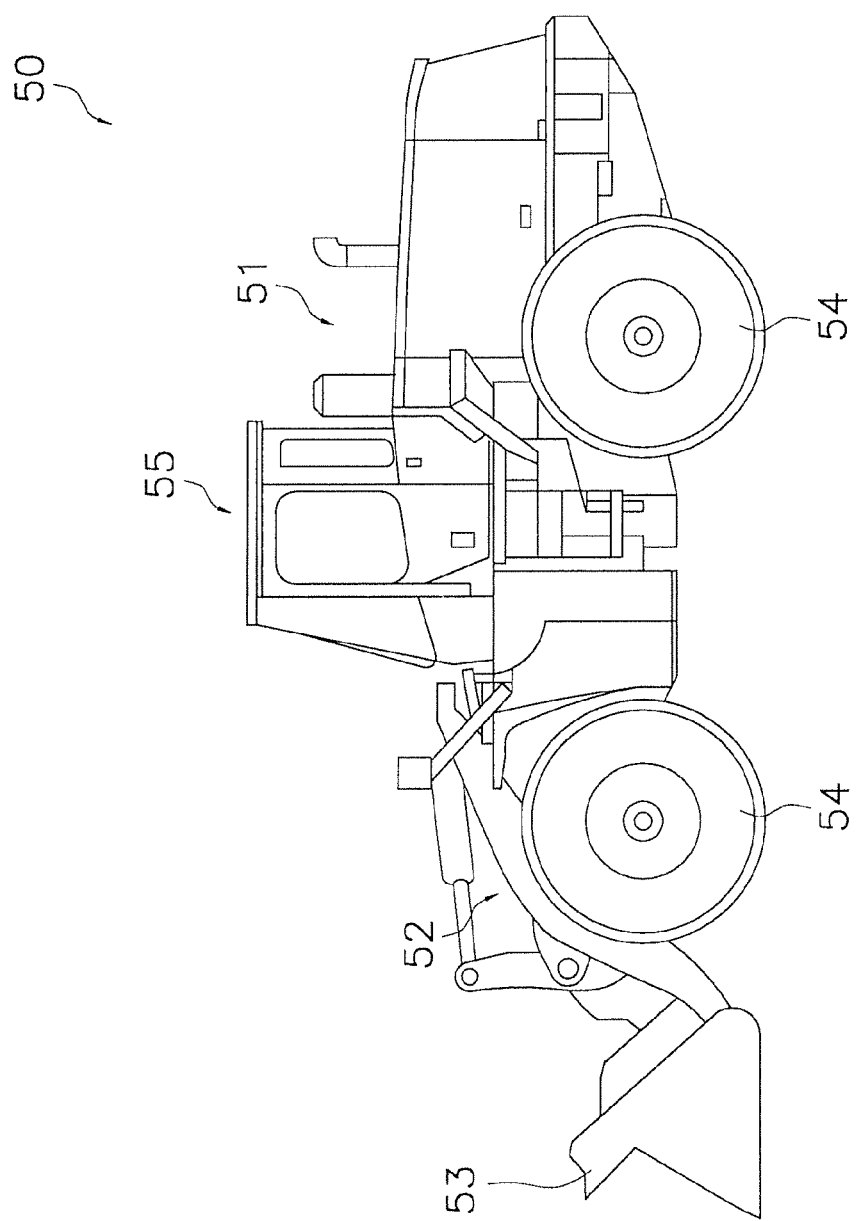
FIG. 1 is a side view of the configuration of a wheel loader pertaining to an embodiment of the present invention.

As shown in FIG. 1, the wheel loader (construction vehicle) 50 pertaining to this embodiment comprises a vehicle body 51, a lift arm (working unit) 52 mounted to the front part of the vehicle body 51, a bucket (working unit) 53 attached to the distal end of this lift arm 52, four tires 54 that rotate while supporting the vehicle body 51 and allow the vehicle body 51 to travel, and a cab 55 installed on top of the vehicle body 51.

Figure 2:
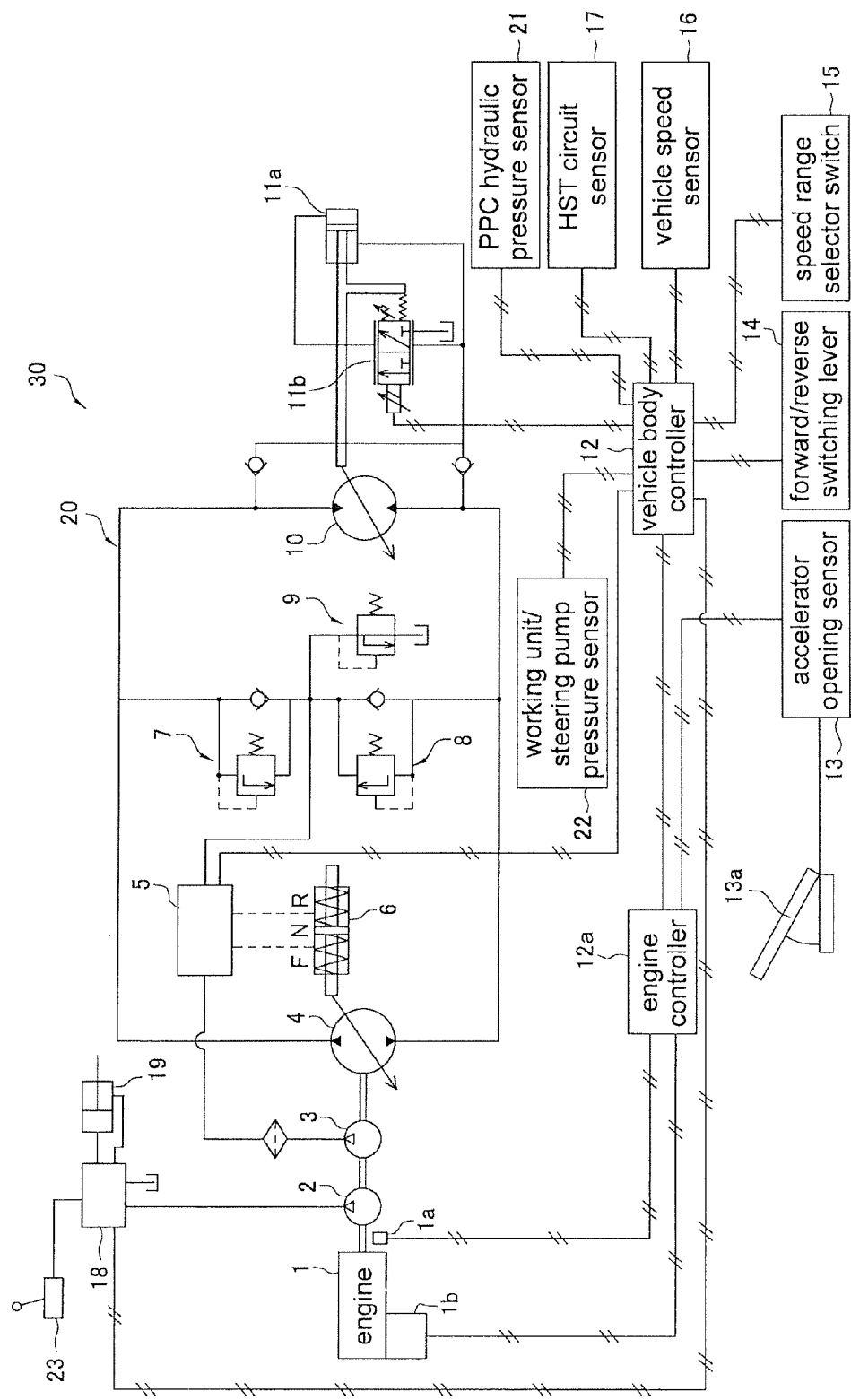
FIG. 2 is a hydraulic circuit diagram showing a one-motor/one-pump HST system installed in the wheel loader of FIG. 1.

The vehicle body 51 has an engine compartment that accommodates an engine 1 (see FIG. 2), a control valve 18 for driving the lift arm 52 and the bucket 53 (see FIG. 2), and a vehicle body controller 12 that controls actuators (a working unit hydraulic cylinder 19 and a travel hydraulic motor 10) and so forth. As shown in FIG. 2, the engine 1, the vehicle body controller 12, an engine controller 12*a*, and so forth are installed on the vehicle body 51. The configuration of the control blocks shown in FIG. 2 will be discussed in detail below.

The lift arm 52 is a member for lifting up the bucket 53 attached at the distal end, and is driven by a lift cylinder 19 (see FIG. 2).

The bucket 53 is attached to the distal end of the lift arm 52, and is dumped and tilted by a bucket cylinder.

Internal Configuration of Wheel Loader 50

Main Configuration

As shown in FIG. 2, the wheel loader 50 in this embodiment employs what is known as a one-motor/one-pump HST system, with which travel is accomplished by driving the travel hydraulic motor 10 with hydraulic fluid discharged from an HST pump (travel hydraulic pump) driven by the engine 1.

Also, the wheel loader 50 is mainly equipped internally with the engine 1, travel-side mechanisms and work-side mechanisms driven by the engine 1, and a hydraulic drive mechanism 30 including the vehicle body controller 12 and the engine controller 12a for controlling the above-mentioned mechanisms.

Hydraulic Drive Mechanism 30

The hydraulic drive mechanism 30 mainly has the engine 1, a working unit/steering pump 2, a charge pump 3, an HST pump 4, the travel hydraulic motor 10, the engine controller 12a, the vehicle body controller 12, an accelerator opening sensor 13, a forward/reverse switching lever 14, a speed range selector switch 15, a vehicle speed sensor 16, an HST circuit sensor (hydraulic sensor) 17, and an HST circuit 20.

The engine 1 is a diesel engine, and the output torque generated by the engine 1 is transmitted to the working unit/steering pump 2, the charge pump 3, the HST pump 4, etc. The engine controller 12a, which controls the speed and output torque of the engine 1, is mounted to the engine 1. The engine controller 12a adjusts the amount of fuel injected according to how much an accelerator pedal 13a is operated (hereinafter referred to as the "accelerator opening"). The engine 1 is also provided with an engine speed sensor 1a that detects the actual speed of the engine 1, and an engine speed signal from the engine speed sensor 1a is inputted to the engine controller 12a. A fuel injector 1b is also connected to the engine 1. The engine controller 12a adjusts the engine speed by controlling the fuel injector 1b according to the accelerator opening.

The accelerator pedal 13a is a means for inputted the target speed of the engine 1, and is connected to the accelerator opening sensor 13. The accelerator pedal 13a is constituted by a potentiometer or the like, and sends an opening signal indicating the detected accelerator opening to the engine controller 12a. Upon receiving an opening signal, the engine controller 12a outputs a command signal to the fuel injector 1b and thereby controls the amount of fuel injected. Thus, the operator controls the speed of the engine 1 by adjusting how much the accelerator pedal 13a is operated.

The HST pump 4 is a variable-volume hydraulic pump driven by the engine 1, and the hydraulic fluid discharged from the HST pump 4 is sent through the HST circuit 20 including high-pressure relief valves 7 and 8 and a low-pressure relief valve 9 to the travel hydraulic motor 10. The hydraulic drive mechanism 30 is provided with the HST circuit sensor 17 that detects the pressure of hydraulic fluid passing through the HST circuit 20 (hereinafter referred to as "HST pressure"). This HST pressure corresponds to the drive hydraulic pressure of the hydraulic fluid that drives the travel hydraulic motor 10. A pump control valve 5 and a pump volume control cylinder 6 for controlling the volume of the HST pump 4 are also connected to the HST pump 4.

The pump control valve 5 is an electromagnetic control valve that controls the pump volume control cylinder 6 on the basis of a control signal from the vehicle body controller 12, and the volume of the HST pump 4 can be varied as desired by controlling the pump volume control cylinder 6.

The charge pump 3 is driven by the engine 1 and serves to supply hydraulic fluid to the HST circuit 20. The charge pump 3 also supplies hydraulic fluid to a pilot circuit of the HST pump 4.

The working unit/steering pump 2 is driven by the engine 1. The hydraulic fluid discharged from the working unit/steering pump 2 is sent through a working unit control-use hydraulic circuit to the lift cylinder 19 and a power cylinder (not shown), and drives the working unit or changes the direction in which the tires 54 are facing. The working unit control-use hydraulic circuit is also provided with the control valve 18, which is driven according to how much a working unit lever 23 is operated and controls the lift cylinder 19, and the lift cylinder 19 is controlled by control of a working unit control valve on the basis of a control signal from the vehicle body controller 12. The bucket cylinder, like the lift cylinder 19, is controlled by a control valve, so it is not shown in FIG. 2.

The travel hydraulic motor 10 is a variable-volume hydraulic motor, is driven by the hydraulic fluid discharged from the HST pump 4, and produces a drive force used for travel. The travel hydraulic motor 10 is provided with a motor cylinder 11a that controls the tilt angle of the travel hydraulic motor 10, and a motor control-use electronic servo valve 11b that controls the motor cylinder 11a. The motor control-use electronic servo valve 11b is an electromagnetic control valve that is controlled on the basis of a control signal from the vehicle body controller 12, and controls the motor cylinder 11a. Consequently, the volume of the travel hydraulic motor 10 can be varied as desired, and the maximum or minimum volume can be set as desired.

The vehicle speed sensor 16 is used to detect the vehicle speed from the rotating speed of a tire drive shaft, and sends a vehicle speed signal to the vehicle body controller 12.

The vehicle body controller 12 electronically controls various control valves on the basis of output signals from various detectors, and controls the volume of the HST pump 4, the volume of the travel hydraulic motor 10, and so forth. Consequently, with the wheel loader 50 of this embodiment, traction and vehicle speed are varied continuously, and the vehicle can automatically change speeds from a vehicle speed of zero to its maximum speed without any gear changes. Control over the travel hydraulic motor 10 by the vehicle body controller 12 will be described in detail in a later section.

The vehicle body controller 12 controls the motor volume of the travel hydraulic motor 10 on the basis of the HST pressure detected by the HST circuit sensor 17, and limits the minimum motor volume according to the speed range. Further, the vehicle body controller 12 performs anti-overrun control so as to control the motor volume depending on vehicle speed, and controls the direction in which the hydraulic fluid is discharged from the HST pump 4 depending on an operation signal from the forward/reverse switching lever 14. The vehicle body controller 12 also controls the minimum motor volume of the travel hydraulic motor 10 according to the engine speed, which will be discussed in detail below.

Switching Control of Absorption Torque of HST Pump 4

With the wheel loader 50 of this embodiment, when the various conditions discussed below are met, the vehicle body controller 12 performs control that switches the matching point of the absorption torque curve of the HST pump 4 with respect to the output torque curve of the engine 1, which indicates the amount of engine torque and the speed of the engine 1 (see FIG. 3).

Figure 3:
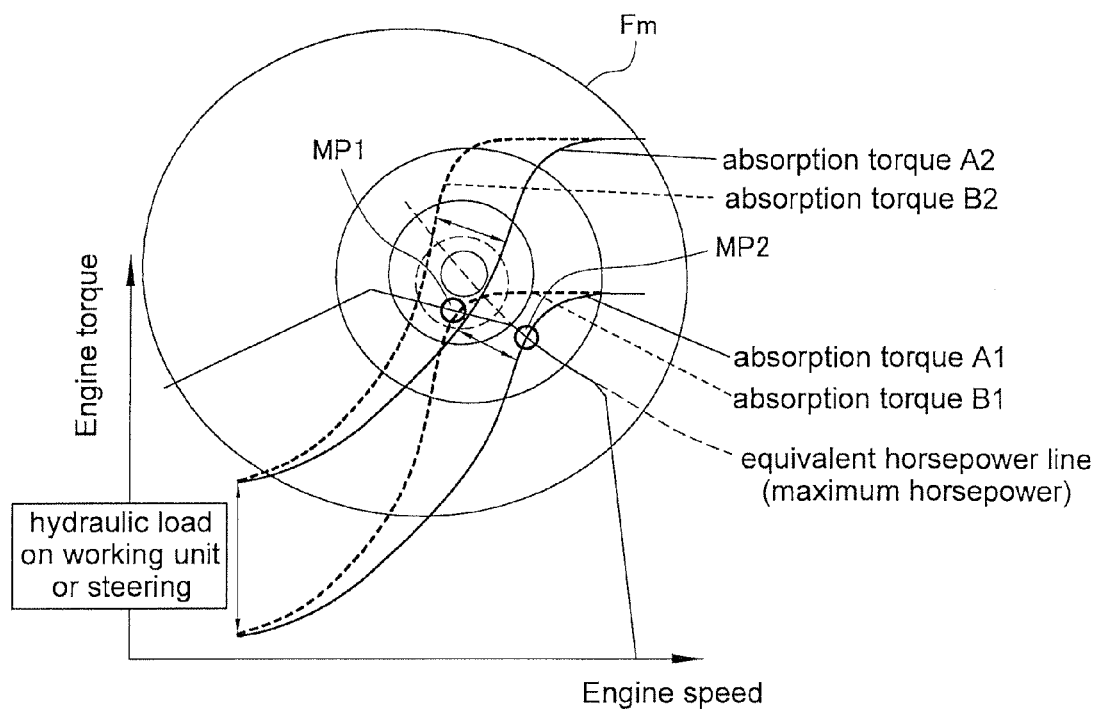
FIG. 3 is a graph of the absorption torque curve for an HST pump and the output torque curve for an engine installed in the wheel loader of FIG. 1.

More specifically, when a relatively light load is exerted on the HST pump 4, such as in a normal travel state, control is performed to select an absorption torque curve B1 for the HST pump 4 so that matching will be on the low-engine speed side (good fuel economy side) with respect to the output torque curve of the engine 1 shown in FIG. 3, and when a heavy load is exerted on the HST pump 4, such as when work is performed during medium- to high-speed travel or when a hill is climbed at high speed, control is performed to select an absorption torque curve A1 for the HST pump 4 so that matching will be on the high-engine speed side (high horsepower side).

When the absorption torque curve B1 is selected, as shown by the fuel map Fm in FIG. 3, the matching point for the output torque curve of the engine 1 and the absorption torque curve of the HST pump 4 is MP1, and the vehicle can travel at close to the highest fuel economy.

The various conditions for controlling the absorption torque switching of the HST pump 4 will be described in detail below.

Control During Hill Climbing-I

Figure 4:
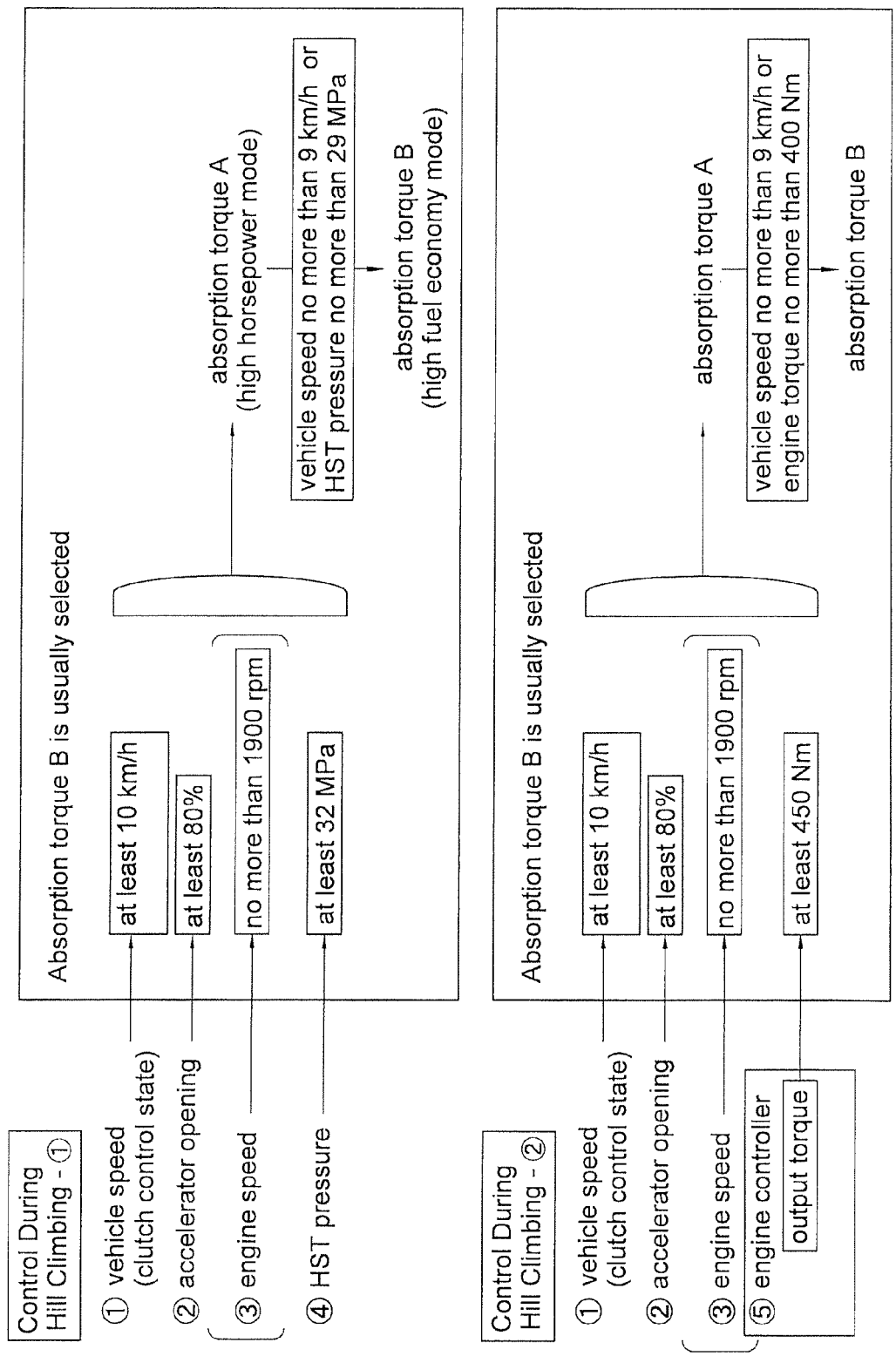
FIG. 4 is a control diagram of the control conditions during hill climbing with the vehicle controller in FIG. 2.

With the wheel loader 50 in this embodiment, as shown in the upper half of FIG. 4, when vehicle speed, accelerator opening, engine speed, and HST pressure each meet the following conditions, the absorption torque curve shown in FIG. 3 switches from B1 to A1, and the matching point is shifted from MP1 on the low-engine speed side to MP2 on the high-engine speed side. A1 and B1 refer to the absorption torque curve on the high horsepower side and the absorption torque curve on the high fuel economy side, respectively.

More specifically, as the first condition, control is performed so that the absorption torque curve of the HST pump 4 is switched from B1, with matching on the low-engine speed side, to A1, with matching on the high-engine speed side, when the following conditions are met:
 a) vehicle speed is at least 10 km/h
 b) accelerator opening is at least 80%,
and
 c1) engine speed is no more than 1900 rpm
or
 c2) HST pressure is at least 32 MPa.

That is, with the first condition, switching control of the absorption torque of the HST pump 4 is performed as above if either the above-mentioned conditions a, b, and c2, or the above-mentioned conditions a, b, c1, and c2 are met.

Here, in the first condition, the reason that vehicle speed (condition a) and accelerator opening (condition b) are essential conditions is that when the driver requires additional acceleration during high-speed travel of the wheel loader 50, we can imagine this to correspond to hill climbing in which the HST pump 4 requires more horsepower than normal. The reason the third conditions c1 and c2 are set as engine speed and/or HST pressure is that we can imagine that a situation in which the engine speed is no more than a prescribed value, or the HST pressure is at least a prescribed value, during high-speed travel at a relatively large accelerator opening, corresponds to hill climbing in which more horsepower is needed for the HST pump 4. Thus, by shifting the matching point in the direction of raising the absorption torque of the HST pump 4, the vehicle can travel in a state of having obtained adequate horsepower for the HST pump 4 if more horsepower is needed, such as during hill climbing at high speed.

Next, we will describe the second condition when control is performed to return the above-mentioned absorption torque curve from A1 to B1 after the curve has been switched from B1 to A1.

More specifically, as the second condition, control is performed to return the absorption torque curve of the HST pump 4 from A1, with matching on the high-engine speed side, to B1, with matching on the low-engine speed side, when the following conditions are met:
 d) vehicle speed is no more than 9 km/h, and/or
 e) HST pressure is no more than 29 MPa.

Here, the reason for setting fewer conditions (d or e) than in the first condition (a+b+c1 or c2) is to allow the wheel loader 50 to travel with the highest fuel economy possible by having it travel on the high horsepower side (high-engine speed matching) only when necessary, and returning it relatively easily to travel on the high fuel economy side (low-engine speed side).

Also, the reason that having vehicle speed and/or HST pressure be no more than a prescribed value is an essential condition in the second condition is that we can imagine a situation in which the vehicle departs from high-speed high climbing when the vehicle speed or HST pressure drops below a prescribed value. In particular, with this embodiment, the accelerator opening and engine speed included in the first condition are not included in the second condition. This is because if the accelerator opening is part of the second condition, there is the risk that the control will not be what the driver intended, such as a rise in the absorption torque of the HST pump due to a switch of the absorption torque curve from A1 to B1 (see FIG. 3), resulting in a rise in vehicle speed, even though the driver has lifted up on the accelerator pedal 13a. This is also because if the engine speed is part of the second condition, there is the risk that frequent shocks will occur during absorption torque switching of the HST pump 4 in response to fluctuations in engine speed.

The reason for providing a difference between the vehicle speed setting (9 km/h) for the above-mentioned condition d and the vehicle speed setting (10 km/h) for condition a is that this avoids frequent switching of the absorption torque curve between the low- and high-engine speed sides. The same applies to the HST pressure setting for the above-mentioned condition e.

Consequently, when a specific first condition is met in a wheel loader 50 in which an HST is installed, travel at the required horsepower is possible by switching the absorption torque curve from B1 to A1 so as to increase the absorption torque of the HST pump 4, and thereby switching the matching point of the output torque curve of the engine 1 from MP1 on the low-engine speed side to MP2 on the high-engine speed side.

Meanwhile, if a specific second condition is met in the above-mentioned state of matching on the high-engine speed side, the absorption torque curve is switched from A1 to B1 so as to reduce the absorption torque of the HST pump 4. Consequently, the matching point with the output torque curve of the engine 1 shifts from MP2 on the high-engine speed side to MP1 on the low-engine speed side, allowing a return to travel with normal fuel economy.

Setting the optimal conditions for the above-mentioned first condition and for the above-mentioned second condition avoids control in a direction other than what the operator intended, or the occurrence of shocks caused by absorption torque switching control during driving.

Control in Work During Medium- to High-Speed Travel-I

Figure 5:
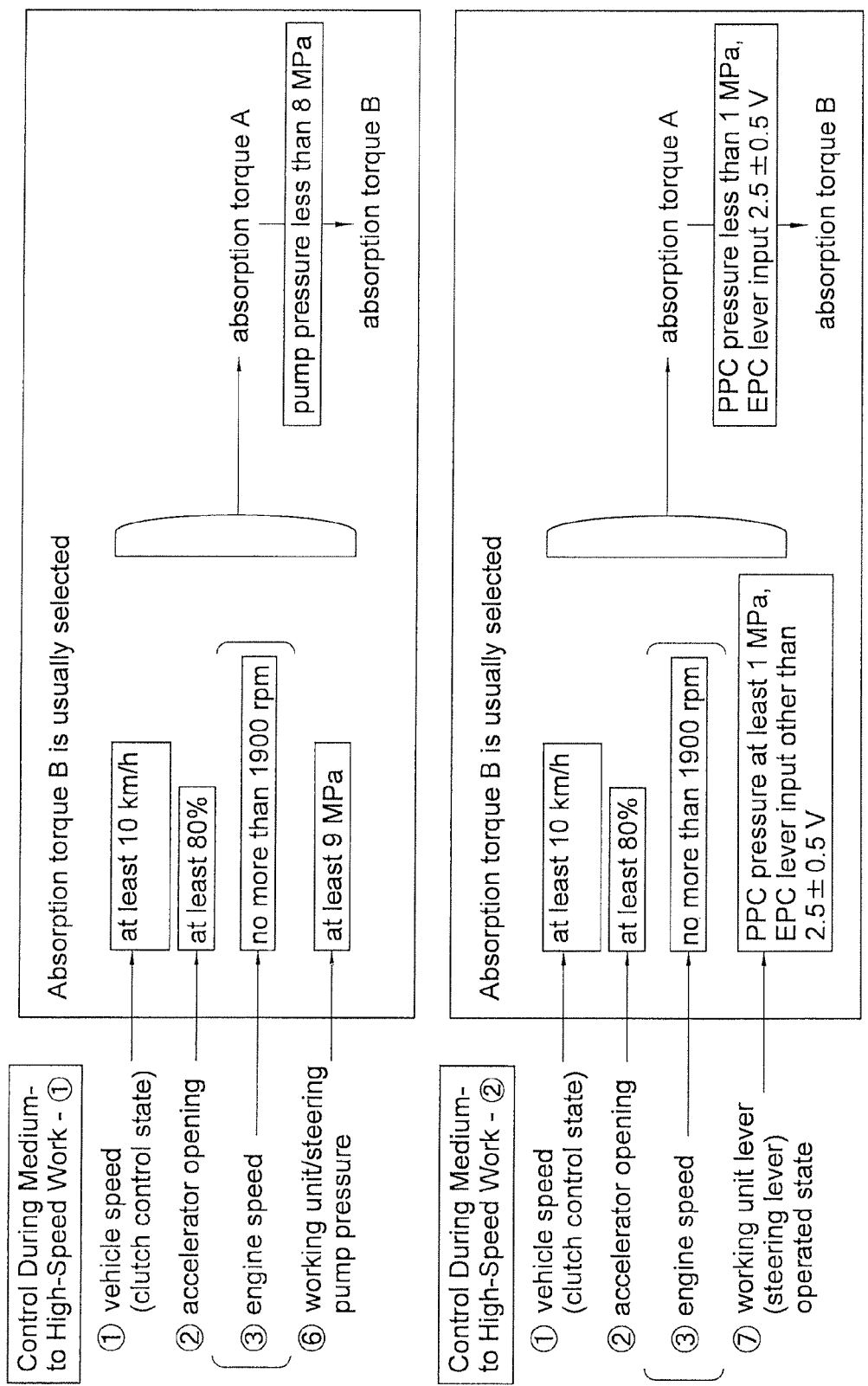
FIG. 5 is a control diagram of the control conditions during work and during medium- to high-speed travel with the vehicle body controller in FIG. 2.

With the wheel loader 50 of this embodiment, in addition to the control during hill climbing discussed above, when the following conditions are met for vehicle speed, accelerator opening, engine speed, and working unit/steering pump pressure, as shown in the upper half of FIG. 5, the absorption torque curve shown in FIG. 3 is switched from B1 to A1, and the matching point is shifted from MP1 on the low-engine speed side to MP2 on the high-engine speed side.

More specifically, control is performed so that the absorption torque curve of the HST pump 4 is switched from B1, with matching on the low-engine speed side, to A1, with matching on the high-engine speed side, when the following conditions are met:

a) vehicle speed is at least 10 km/h (clutch released)
b) accelerator opening is at least 80%, and
c1) engine speed is no more than 1900 rpm and/or
g) working unit/steering pump pressure is at least 9 MPa (third condition).

That is, in this embodiment, the above-mentioned absorption torque switching is performed for the HST pump 4 if either the above-mentioned conditions a, b, and g, or the above-mentioned conditions a, b, g, and c1 are met.

Here, the reason for listing the working unit/steering pump pressure detected by a working unit/steering pump pressure sensor 22 in condition g as a third condition is that we can imagine that the working unit (lift arm 52 or bucket 53) will be in an operating state when the working unit/steering pump pressure is at least a prescribed value and the accelerator opening is at least 80% during medium- to high-speed travel of at least 10 km/h. Thus, when this third condition is also met, if the matching point is shifted in the direction or raising the absorption torque of the HST pump 4, the vehicle can travel in a state of having obtained adequate horsepower for the HST pump 4 when using a working unit during medium- to high-speed travel, etc.

Next, we will describe the second condition when control is performed to return the above-mentioned absorption torque curve from A1 to B1 after the curve has been switched from B1 to A1.

More specifically, as a fifth condition, control is performed to return the absorption torque curve of the HST pump 4 from A1, with matching on the high-engine speed side, to B1, with matching on the low-engine speed side, when the following condition is met:

h) working unit/steering pump pressure is no more than 8 MPa.

Here, the reason for setting condition h as the fifth condition is that we can imagine that the vehicle has already departed from a working unit usage state during medium- to high-speed travel when the pump pressure is no more than a prescribed value during medium- to high-speed travel.

The reason for providing a difference between the working unit/steering pump pressure setting (9 MPa) in the above-mentioned condition g and the working unit/steering pump pressure setting (8 MPa) in condition h is that this avoids frequent switching of the absorption torque curve between the low- and high-engine speed sides.

Consequently, when a specific third condition is met in a wheel loader 50 in which an HST is installed, travel at the required horsepower is possible, even when a working unit is being used during medium- to high-speed travel, by switching the absorption torque curve from B1 to A1 so as to increase the absorption torque of the HST pump 4, and thereby switching the matching point of the output torque curve of the engine 1 from MP1 on the low-engine speed side to MP2 on the high-engine speed side.

Meanwhile, when a specific fifth condition is met in a state of matching on the high-engine speed side as discussed above, the vehicle can be returned to travel with normal fuel economy by switching the absorption torque curve from A1 to B1 so as to reduce the absorption torque of the HST pump 4, and thereby switching the matching point with the output torque curve of the engine 1 from MP2 on the high-engine speed side to MP1 on the low-engine speed side.

Setting the above-mentioned third condition and the above-mentioned fifth condition to their respectively optimal settings avoids control in a direction other than what the operator intended, or the occurrence of shocks caused by absorption torque switching control during driving.

Control During Excavation, Raking, etc.-I

With the wheel loader 50 of this embodiment, the absorption torque curve of the HST pump 4 is switched from matching on the low-engine speed side to that on the high-engine speed side even during excavation, raking, etc.

Figure 6:
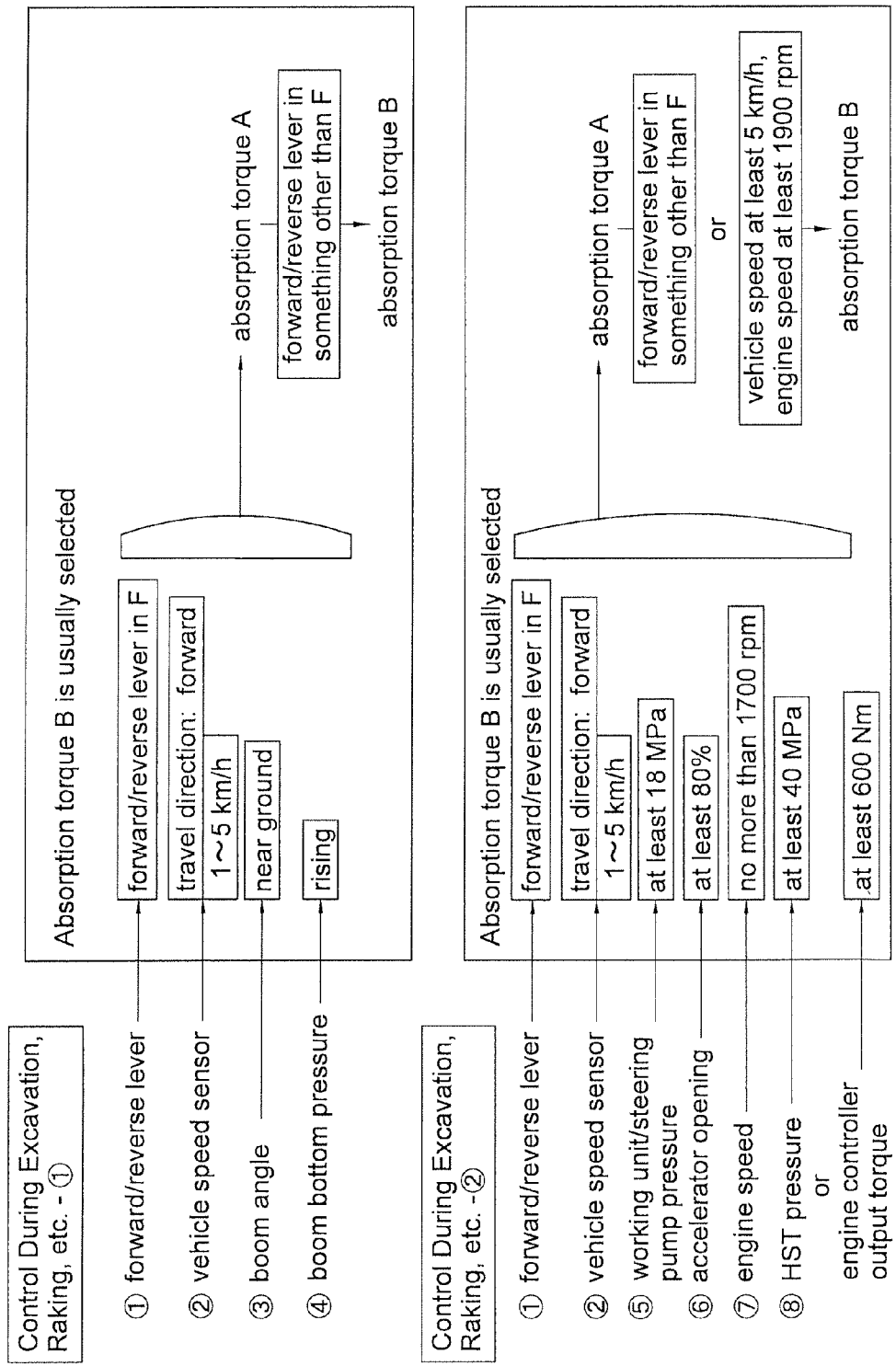
FIG. 6 is a control diagram of the control conditions during excavation or raking with the vehicle body controller in FIG. 2.

Specifically, as shown in the upper half of FIG. 6, when the following conditions are met for the forward/reverse switching lever 14, the vehicle speed sensor 16, boom angle, and boom bottom pressure, the absorption torque curve shown in FIG. 3 is switched from B2 to A2 so that the matching point is shifted from the low-engine speed side to the high-engine speed side. An angle sensor attached to the boom, a stroke sensor attached to the lift cylinder, or the like can be used in the detection of the above-mentioned boom angle, for example. A boom bottom pressure sensor that detects the pressure on the bottom side of the lift cylinder can be used to detect the above-mentioned boom bottom pressure.

The absorption torque curves A2 and B2 here show the total absorption torque when under a high load other than from travel (such as a working unit or steering), with respect to the above-mentioned absorption torque curves A1 and B2.

More specifically, control is performed so that the absorption torque curve of the HST pump 4 is switched from B2, with matching on the low-engine speed side, to A2, with matching on the high-engine speed side, when the following conditions are met:

k) the forward/reverse switching lever 14 is in forward (F),
l) the vehicle speed sensor indicates 1 to 5 km/h moving straight ahead, and
m) the boom bottom pressure rises.

That is, in this embodiment, switching control of the absorption torque of the HST pump 4 is performed when the above-mentioned conditions k, l, and m are met.

The reason for checking the detection result of the vehicle speed sensor and the operation status of the forward/reverse switching lever 14 as the above-mentioned switching conditions is to detect that the vehicle is traveling forward at low speed. The reason for checking the boom bottom pressure is to detect a state in which the working unit is subjected to a high load. In addition to detecting the boom bottom pressure, the means for detecting a state of a high load on the working unit may be detecting, through the operation state of the manipulation lever of the working unit and the boom angle, that the bucket 53 has been tilted and the boom is being raised. Thus, stalling or a decrease in the speed or horsepower of the engine 1, or a decrease in the drive speed of the working unit, can be prevented even under high-load work while the vehicle is moving forward at low speed, by shifting the matching point in the direction of raising the absorption torque of the HST pump 4 when these conditions k, l, and m are met.

Next we will describe the second condition when control is performed to return the above-mentioned absorption torque curve from A2 to B2 after it was switched from B2 to A2.

More specifically, control is performed to return the absorption torque curve of the HST pump 4 from A2, with matching on the high-engine speed side, to B2, with matching on the low-engine speed side, when the following condition is met:

n) the forward/reverse switching lever 14 is in something other than the F position.

Here, the reason for setting condition n as a condition for returning the matching point to the lows is that we can imagine that the vehicle departs from a situation in which a high load is exerted on the working unit when the forward/reverse switching lever 14 is in something other than the F position, that is, when it is in neutral (N) or reverse (R).

Consequently, when the specific conditions k, l, and m are met in a wheel loader 50 in which an HST is installed, stalling or a decrease in the speed or horsepower of the engine 1, or a decrease in the drive speed of the working unit, can be avoided even when the working unit is subjected to a high load while the vehicle is moving forward at low speed, by switching the absorption torque curve from B2 to A2 so that the absorption torque of the HST pump 4 will increase, and switching the matching point with the output torque curve of the engine 1 from the low-engine speed side to the high-engine speed side.

On the other hand, when the specific condition n is met in a state of matching on the high-engine speed side as discussed above, the vehicle can return to travel at ordinary fuel economy by switching the absorption torque curve from A2 to B2 so that the absorption torque of the HST pump 4 will be lower, and switching matching point with the output torque curve of the engine 1 from the high-engine speed side to the low-engine speed side.

Embodiment 2

Another embodiment of the present invention will be described below.

In this embodiment, control is performed as follows as another example of control during hill climbing as discussed above.

Control During Hill Climbing-II

In this embodiment, as another example of control during hill climbing, as shown in the lower half of FIG. 4, the absorption torque curve shown in FIG. 3 is switched from B1 to A1, and the matching point is shifted from MP1 on the low-engine speed side to MP2 on the high-engine speed side when the following conditions are met for vehicle speed, accelerator opening, engine speed, and output torque of the engine controller 12*a*.

More specifically, as the first condition, control is performed so that the absorption torque curve of the HST pump 4 is switched from B1, with matching on the low-engine speed side, to A1, with matching on the high-engine speed side, when the following conditions are met:

a) vehicle speed is at least 10 km/h (clutch released)

b) accelerator opening is at least 80%, and c1) engine speed is no more than 1900 rpm and/or c3) output torque of engine controller 12*a* is at least 450 N·m.

That is, the above-mentioned switching control of the absorption torque of the HST pump 4 is performed when either the above conditions a, b, and c3, or the above conditions a, b, c1, and c3 are met.

The reason for setting engine speed and/or the output torque of the engine controller 12*a* as the third conditions c1 and c3 in the first condition is that we can imagine that a situation in which the engine speed is at or below a prescribed value or the output torque of the engine controller 12*a* is at least a prescribed value during high-speed travel at a relatively wide accelerator opening corresponds to hill climbing in which the HST pump 4 needs high absorption torque. Thus, when this first condition is met, the vehicle can travel in a state in which sufficient absorption torque is obtained for the HST pump 4 when such torque is necessary, such as in hill climbing at a high speed, just as with the above-mentioned "Control During Hill Climbing-I," by shifting the matching point in the direction of raising the absorption torque of the HST pump 4.

Next, we will describe a second condition when the above-mentioned absorption torque curve is returned from A1 to B1 after it has been switched from B1 to A1.

More specifically, as the second condition, control is performed to return the absorption torque curve of the HST pump 4 from A1, with matching on the high-engine speed side, to B1, with matching on the low-engine speed side, when the following conditions are met:

d) vehicle speed is no more than 9 km/h, and/or f) output torque of engine controller 12*a* is no more than 400 N·m.

Here, the reason for setting fewer conditions (d or f) in the second condition than in the first condition (a+b+c1 or c3) is the same as that in the above-mentioned "Control During Hill Climbing-I."

Also, the reason that having vehicle speed and/or the output torque of the engine controller 12*a* be no more than a prescribed value is an essential condition in the second condition is that we can imagine a situation in which the vehicle departs from high-speed high climbing when the vehicle speed or output torque drops below a prescribed value.

Consequently, with a wheel loader 50 in which an HST is installed, travel at the required horsepower is possible just as in the above-mentioned "Control During Hill Climbing-I" when a specific first condition is met.

On the other hand, when a specific second condition is met in a state in which there is the above-mentioned matching on the high-engine speed side, the vehicle can be returned to travel at normal fuel economy just as in the above-mentioned "Control During Hill Climbing-I."

Further, just as in the above-mentioned "Control During Hill Climbing-I," setting the optimal conditions for the above-mentioned first condition and the above-mentioned second condition prevents control other than what the operator intended, or shocks produced by absorption torque switching during driving.

Embodiment 3

Yet another embodiment of the present invention will now be described.

In this embodiment, the following control is performed as another example instead of the "Control in Work During Medium- to High-Speed Travel-I" described in Embodiment 1 above.

Control in Work During Medium- to High-Speed Travel-II

In this embodiment, as another example of control in work during medium- to high-speed travel, as shown in the lower half of FIG. 5, the absorption torque curve shown in FIG. 3 is switched from B1 to A1, and the matching point is shifted from MP1 on the low-engine speed side to MP2 on the high-engine speed side when the following conditions are met for vehicle speed, accelerator opening, engine speed, and the usage state of the working unit lever 23 or steering lever.

More specifically, as a fourth condition, control is performed so that the absorption torque curve of the HST pump 4 is switched from B1, with matching on the low-engine speed side, to A1, with matching on the high-engine speed side, when the following conditions are met:

a) vehicle speed is at least 10 km/h (clutch released)

b) accelerator opening is at least 80%, and c1) engine speed is no more than 1900 rpm and/or i) PPC pressure of the working unit lever 23 is at least 1 MPa (or the EPC lever input is something other than 2.5±0.5 V).

That is, the above-mentioned switching control of the absorption torque of the HST pump 4 is performed when the above-mentioned conditions a, b, and i or the above-mentioned conditions a, b, c1, and i are met.

The reason for adding condition i as part of the fourth condition is that the usage state of the working unit can be ascertained by checking the EPC lever input or the PPC pressure of the working unit lever 23 detected by a PPC hydraulic pressure sensor 21, and we can imagine a situation in which the working unit is used during medium- to high-speed travel when the above-mentioned conditions a, b, i, etc., are met. Thus, when this condition is met, the vehicle can travel in a state in which sufficient absorption torque is obtained for the HST pump 4 when such torque is necessary, such as when using a working unit during medium- to high-speed travel, just as with the above-mentioned "Control in Work During Medium- to High-Speed Travel-I," by shifting the matching point in the direction of raising the absorption torque of the HST pump 4. The above-mentioned PPC pressure of the working unit lever 23 is detected by the PPC hydraulic pressure sensor 21, and when using a pilot hydraulic type of working unit lever 23, this refers to the pilot pressure produced in the working unit control-use hydraulic circuit according to how much the working unit lever 23 is operated. The above-mentioned EPC lever input refers to an electrical signal outputted according to how much the working unit lever 23 is operated, when using an electrical working unit lever 23.

Next, we will describe a second condition when the above-mentioned absorption torque curve is returned from A1 to B1 after it has been switched from B1 to A1.

More specifically, as a fifth condition, control is performed to return the absorption torque curve of the HST pump 4 from A1, with matching on the high-engine speed side, to B1, with matching on the low-engine speed side, when the following condition is met:

j) PPC pressure is less than 1 MPa, or EPC lever input is 2.5±0.5 V.

The reason here for setting fewer conditions (j) in the fifth condition than in the first condition (a+b+c1 or i) is the same as in the above-mentioned "Control in Work During Medium- to High-Speed Travel-I."

The reason for using the PPC pressure of the EPC lever input as a switching condition in the fifth condition is to make it easier to decide whether or not the working unit is being used, assuming that one or the other is a determination material.

Just as in the above-mentioned "Control in Work During Medium- to High-Speed Travel-I," travel at the required horsepower is possible when the above-mentioned specific conditions (a, b, and c1, or a, b, and i, or a, b, c1, and i) are met in a wheel loader 50 in which an HST is installed.

Meanwhile, when the above-mentioned specific condition j is not met in a state of matching on the high-engine speed side as discussed above, the vehicle can be returned to travel with normal fuel economy just as with the above-mentioned "Control in Work During Medium- to High-Speed Travel-I."

Further, just as in the above-mentioned "Control in Work During Medium- to High-Speed Travel-I," setting the optimal conditions for the above-mentioned first condition and the above-mentioned second condition prevents control in a direction not intended by the operator, or shocks produced by absorption torque switching during driving.

Embodiment 4

Yet another embodiment of the present invention will now be described.

In this embodiment, the following control is performed as another example instead of the "Control During Excavation, Raking, etc.-I" described in Embodiment 1 above.

Control During Excavation, Raking, etc.-II

With the wheel loader 50 of this embodiment, as another example of control of a working unit high-load state during forward travel at low speed, as shown in the lower half of FIG. 6, the absorption torque curve shown in FIG. 3 is switched from B2 to A2, and the matching point is shifted from the low-engine speed side to the high-engine speed side, when the following conditions are met for the forward/reverse switching lever 14, a vehicle speed sensor, working unit/steering pump pressure, accelerator opening, engine speed, HST pressure, and output torque of the engine controller 12a.

More specifically, control is performed so that the absorption torque curve of the HST pump 4 is switched from B2, with matching on the low-engine speed side, to A2, with matching on the high-engine speed side, when the following conditions are met:

k) the forward/reverse switching lever 14 is in forward (F), l) the vehicle speed sensor indicates 1 to 5 km/h moving straight ahead, o) the working unit/steering pump pressure is at least 18 MPa, p) the accelerator opening is at least 80%, q) the engine speed is no more than 1700 rpm, and r) the HST pressure is 40 MPa, or the output torque of the engine controller 12a is at least 600 N·m.

That is, the above-mentioned switching control of the absorption torque of the HST pump 4 is performed when the above-mentioned conditions k, l, o, p, q, and r are met.

The reason for setting conditions o, p, q, and r as the above-mentioned switching conditions is that we can imagine that a state in which the engine speed has decreased even though the accelerator opening is wide, or a state in which the output torque of the vehicle body controller 12 or the HST pressure is at least a prescribed value, is a situation in which the travel or work load is high. Thus, when these conditions are met, a state can be obtained in which sufficient absorption torque is obtained for the HST pump 4 when such torque is necessary, such as in a high-load state during forward travel at low speed, just as with the above-mentioned "Control During Excavation, Raking, etc.-I," by shifting the matching point in the direction of raising the absorption torque of the HST pump 4.

Next, we will describe the condition when control is performed to return the above-mentioned absorption torque curve from A2 to B2 after the curve has been switched from B2 to A2.

More specifically, control is performed to return the absorption torque curve of the HST pump 4 from A2, with matching on the high-engine speed side, to B2, with matching on the low-engine speed side, when the following conditions are met:

s) the forward/reverse switching lever 14 is in a position other than F, and t) the vehicle speed is at least 5 km/h and engine speed is at least 1900 rpm.

The reason for using the forward/reverse switching lever 14 or vehicle speed plus engine speed as a switching condition in the above-mentioned condition is to make it easier to decide whether or not the vehicle has departed from a high-load state during forward travel at low speed, assuming that one or the other is a determination material.

Consequently, when the above-mentioned specific conditions (k, l, o, p, q, and r) are met in a wheel loader 50 in which an HST is installed, stalling or a decrease in the speed or horsepower of the engine or in working unit speed can be prevented, just as in the above-mentioned "Control During Excavation, Raking, etc.-I".

Meanwhile, the vehicle can be returned to travel at normal fuel economy, just as in the above-mentioned "Control During Excavation, Raking, etc.-I" when the above-mentioned specific condition s or t is met in a state of matching on the high-engine speed side as discussed above.

Other Embodiments

An embodiment of the present invention was described above, but the present invention not limited to or by the above embodiment, and various modifications are possible without departing from the gist of the invention.

(A) In the above embodiment, we described as an example of a condition for detecting that the vehicle is climbing a hill at high speed a case in which the vehicle speed, accelerator opening, engine speed, HST pressure, and engine controller output torque were at least or no more than a prescribed value, but the present invention is not limited to or by this.

For instance, the thresholds (prescribed values) set for the various conditions may be set for each model of various construction vehicles, or may be such that the settings can be changed as needed according to the driver's preferences or to the exact type of work performed by the construction vehicle.

The magnitude of the thresholds (prescribed values) set for the various conditions can also be changed as needed for control in work during medium- to high-speed travel.

The absorption torque A1 (A2) during high-speed hill climbing and the A1 (A2) during medium- to high-speed work do not necessarily have to coincide on the same curve. Also, in the control shown in FIGS. 4 and 5, the engine speed does not necessarily have to be a single condition. Furthermore, the engine controller and the vehicle body controller do not necessarily have to be separate, and may both be incorporated as a single controller.

(B) In the above embodiment, we described as an example a wheel loader 50 equipped with a one-pump/one-motor HST system including one hydraulic pump and one travel hydraulic motor, but the present invention is not limited to or by this.

Figure 7:
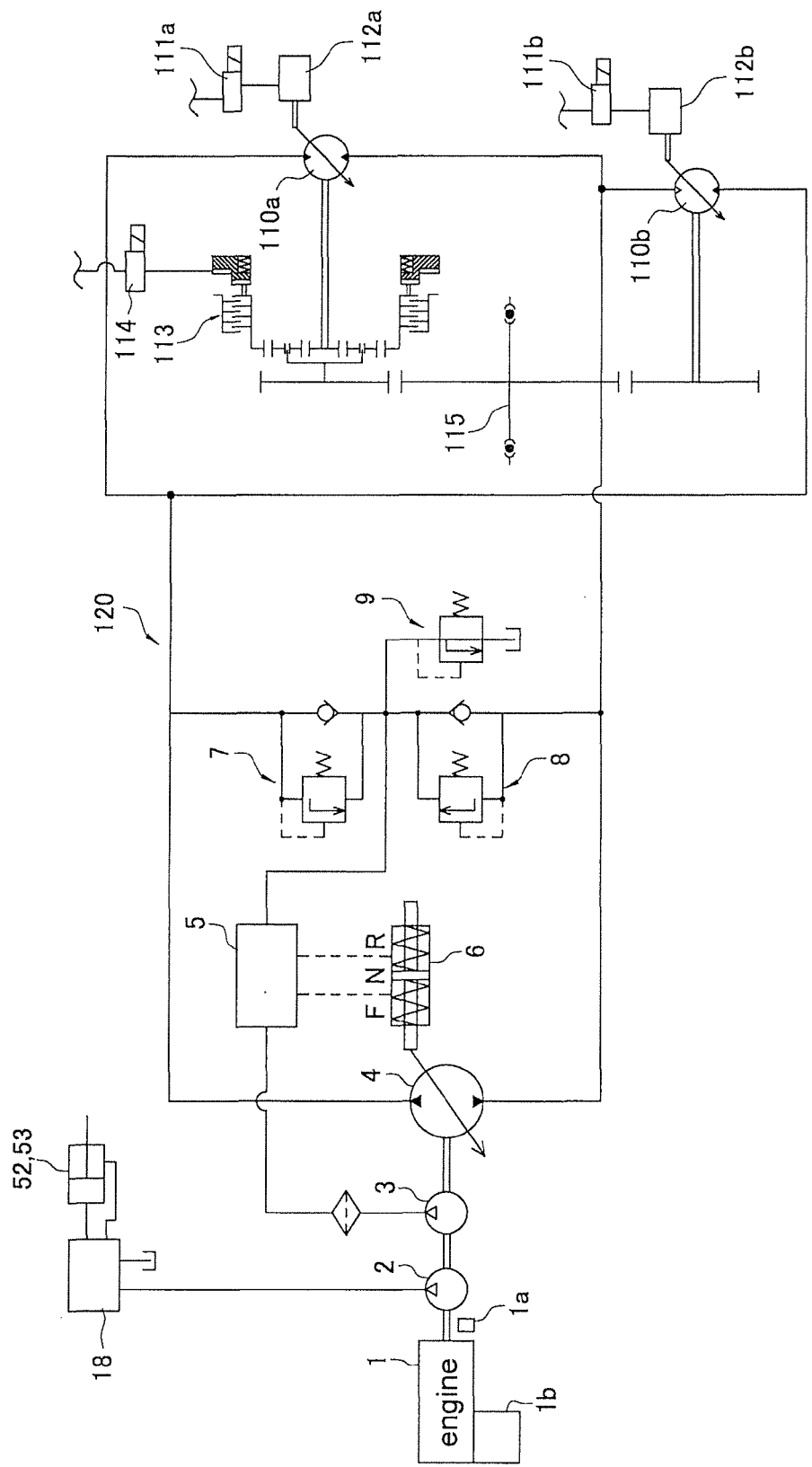
FIG. 7 is a hydraulic circuit diagram showing the hydraulic circuit installed in a construction vehicle pertaining to another embodiment of the present invention.

For example, as shown in FIG. 7, the present invention may be applied to a construction vehicle equipped with a one-pump/two-motor HST system that includes two travel hydraulic motors 110a and 110b, first and second motor control valves 111a and 111b, first and second motor cylinders 112a and 112b, a clutch 113, a clutch control valve 114, a driveshaft 115, and an HST circuit 120.

In this case, for example, condition a included in the above-mentioned first condition may be replaced with a state in which there has been a switch to the travel hydraulic motor 110b for high-speed travel, that is, a state in which the clutch 113 has been released, as a switching control condition.

(C) In the above embodiment, the wheel loader 50 was given as an example of a construction vehicle to which the present invention is applied, but the present invention is not limited to or by this.

For example, the present invention can be applied to another construction vehicle in which an HST is installed.

The construction vehicle of the above illustrated embodiments can be widely applied in the field of wheel loaders and other such construction vehicles because it prevents shocks or discomfort to the driver during control switching, and therefore allows the work to be carried out more pleasantly.

The invention claimed is:

1. A construction vehicle comprising:
an engine;
a travel hydraulic pump configured to be driven by the engine;
a travel hydraulic motor configured to be driven by hydraulic fluid discharged from the travel hydraulic pump;
an accelerator pedal configured to adjust an accelerator opening degree according to a pressed amount thereof;
a hydraulic sensor configured to detect a pressure of the hydraulic fluid sent from the travel hydraulic pump to the travel hydraulic motor;
an engine controller configured to adjust an output torque from the engine; and
a controller programmed to change a matching point of an absorption torque curve for the travel hydraulic pump with respect to an output torque curve for the engine from a low-engine speed side to a high-engine speed side when a first condition is met, and to change the matching point from the high-engine speed side to the low-engine speed side when a second condition is met,
the first condition being satisfied when a vehicle speed and the accelerator opening degree are prescribed values or higher, and at least one of
the engine speed is a specific value or lower,
a hydrostatic transmission pressure sent from the hydraulic sensor is a prescribed value or lower, and
the output torque adjusted by the engine controller is a prescribed value or higher, and the second condition being satisfied when one of the vehicle speed, the hydrostatic transmission pressure and the output torque adjusted by the engine controller is a prescribed value or lower.

2. The construction vehicle according to claim 1, further comprising
a working unit/steering pump configured to drive a working unit,
the first condition further including a third condition that is satisfied when a pressure of the working unit/steering pump is a prescribed value or higher, or a fourth condition that is satisfied when a proportional pressure control pressure of an operating lever that operates the working unit is a prescribed value or higher or an electronic pressure control lever input is other than a prescribed value, and
the second condition further including a fifth condition that is satisfied when the pressure of the working unit/steering pump is a prescribed value or lower, or the proportional pressure control pressure is a prescribed value or lower or the electronic pressure control lever input is the prescribed value.

* * * * *